US009669373B2

(12) United States Patent
Mehlberg

(10) Patent No.: US 9,669,373 B2
(45) Date of Patent: Jun. 6, 2017

(54) APPARATUS AND PROCESS FOR HEATING CATALYST FROM A REACTOR

(71) Applicant: UOP LLC, Des Plaines, IL (US)

(72) Inventor: Robert L. Mehlberg, Wheaton, IL (US)

(73) Assignee: UOP LLC, Des Plaines, IL (US)

( * ) Notice: Subject to any disclaimer, the term of this patent is extended or adjusted under 35 U.S.C. 154(b) by 140 days.

(21) Appl. No.: 14/568,258

(22) Filed: Dec. 12, 2014

(65) Prior Publication Data
US 2016/0167004 A1  Jun. 16, 2016

(51) Int. Cl.
B01J 8/00 (2006.01)
B01J 8/18 (2006.01)
B01J 8/24 (2006.01)
B01J 8/26 (2006.01)
B01J 8/28 (2006.01)
B01J 19/00 (2006.01)
B01J 19/24 (2006.01)
C10G 11/00 (2006.01)
C10G 11/20 (2006.01)
C10G 11/22 (2006.01)
B01J 8/30 (2006.01)
C10G 11/18 (2006.01)

(52) U.S. Cl.
CPC .............. B01J 8/1836 (2013.01); B01J 8/30 (2013.01); C10G 11/18 (2013.01)

(58) Field of Classification Search
CPC ..... B01J 8/00; B01J 8/18; B01J 8/1836; B01J 8/24; B01J 8/26–8/30; B01J 19/00; B01J 19/24; C10G 11/00; C10G 11/20; C10G 11/22
See application file for complete search history.

(56) References Cited

U.S. PATENT DOCUMENTS

| 2,741,581 | A | * | 4/1956 | Conn | ..................... C10G 35/14 208/134 |
| 3,978,150 | A | | 8/1976 | McWilliams, Jr. | |
| 5,399,258 | A | | 3/1995 | Fletcher et al. | |
| 5,914,433 | A | | 6/1999 | Marker | |
| 6,267,873 | B1 | | 7/2001 | Das et al. | |
| 6,867,341 | B1 | | 3/2005 | Abrevaya et al. | |
| 7,268,265 | B1 | | 9/2007 | Stewart et al. | |
| 2012/0012504 | A1 | * | 1/2012 | Minami | ................. B01J 29/048 208/134 |
| 2013/0006028 | A1 | * | 1/2013 | Xie | ...................... C10G 51/026 585/302 |

(Continued)

FOREIGN PATENT DOCUMENTS

WO  2014005996 A1  1/2014

OTHER PUBLICATIONS

U.S. Appl. No. 14/568,263, filed Dec. 12, 2014.

(Continued)

Primary Examiner — Natasha Young

(57) ABSTRACT

A process and apparatus for heating catalyst is presented. Cooler catalyst is removed from a reactor and heated with a hot gas in a riser, heated in a heating tube or heated in a heating chamber. Heated catalyst is disengaged from the hot gas if necessary and returned to the reactor. The process and apparatus can be used for producing light olefins. The hot gas may be a flue gas from an FCC regenerator or a combustion gas from a heater.

20 Claims, 6 Drawing Sheets

(56) References Cited

U.S. PATENT DOCUMENTS

2013/0168289 A1    7/2013  Saidulu et al.
2013/0172643 A1    7/2013  Pradeep et al.

OTHER PUBLICATIONS

U.S. Appl. No. 14/568,265, filed Dec. 12, 2014.
U.S. Appl. No. 14/568,267, filed Dec. 12, 2014.
U.S. Appl. No. 14/568,270, filed Dec. 12, 2014.
U.S. Appl. No. 14/568,274, filed Dec. 12, 2014.

* cited by examiner

APPARATUS AND PROCESS FOR HEATING CATALYST FROM A REACTOR

FIELD

The field relates to hydrocarbon cracking processes and in particular the production of light olefins from cracking a heavy hydrocarbon feedstock.

BACKGROUND

The production of light olefins, ethylene and propylene, are used in the production of polyethylene and polypropylene, which are among the most commonly manufactured plastics today. Other uses for ethylene and propylene include the production of other chemicals. Examples include vinyl monomer, vinyl chloride, ethylene oxide, ethylbenzene, cumene, and alcohols. The production of ethylene and propylene is chiefly performed by the cracking of heavier hydrocarbons. The cracking process includes stream cracking of lighter hydrocarbons and catalytic cracking of heavier hydrocarbon feedstocks, such as gas oils, atmospheric resid and other heavy hydrocarbon streams.

Currently, the majority of light olefins production is from steam cracking and fluid catalytic cracking (FCC). To enhance propylene yields from FCC, shape selective additives are used in conjunction with conventional FCC catalysts comprising Y-zeolites. However, the demand for light olefins is still growing and other means of increasing the production of light olefins have been sought. Other means include paraffin dehydrogenation, which represents an alternative route to light olefins and is described in U.S. Pat. No. 3,978,150. More recently, the desire for alternative, non-petroleum based feeds for light olefin production has led to the use of oxygenates such as alcohols and, more particularly, methanol, ethanol, and higher alcohols or their derivatives. Methanol, in particular, is useful in a methanol-to-olefin (MTO) conversion process described, for example, in U.S. Pat. No. 5,914,433. The yield of light olefins from such a process may be improved using olefin cracking to convert some or all of the C4+, MTO product in an olefin cracking reactor, as described in U.S. Pat. No. 7,268,265. Other processes for the generation of light olefins involve high severity catalytic cracking of naphtha and other hydrocarbon fractions. A catalytic naphtha cracking process of commercial importance is described in U.S. Pat. No. 6,867,341.

Despite the variety of methods for generating light olefins industrially, the demand for ethylene and propylene is still increasing and is expected to continue. A need therefore exists for new methods that can economically increase light olefin yields from existing sources of both straight-run and processed hydrocarbon streams.

SUMMARY OF THE INVENTION

There is an increasing demand for light olefins, and in particular propylene. The present process and apparatus heats cooled catalyst from a secondary reactor with a hot gas in a heating riser or a heater or uses a riser to raise catalyst to be heated in a FCC regenerator for a primary FCC reactor or to return heated catalyst to the secondary reactor. The secondary reactor may be used in conjunction with the primary reactor to increase the yields of light olefins produced from the cracking of a hydrocarbon feedstock in the primary reactor.

In an apparatus embodiment, the invention comprises a reactor vessel comprising a hydrocarbon feed inlet, a catalyst outlet in the reactor vessel, a product outlet in the reactor vessel and a catalyst inlet to the reactor vessel. A heating chamber is in direct communication with the catalyst outlet and a source of gas. A riser is in downstream communication with the heating chamber at a first end, and the catalyst inlet is in downstream communication with a second end of the riser.

In a process embodiment, the invention comprises a process for heating a catalyst bed to promote a reaction comprising passing a hydrocarbon feed stream to a reactor vessel to react over a catalyst bed in the reactor vessel and produce a product gas. The product gas stream and a catalyst stream are withdrawn from the reactor vessel. The catalyst stream is passed from the reactor vessel to a heating chamber. The catalyst stream is heated with a gas stream in the heating chamber, and the heated catalyst stream is passed to the reactor vessel.

Other objects, advantages and applications of the present invention will become apparent to those skilled in the art from the following detailed description and drawings.

BRIEF DESCRIPTION OF THE DRAWINGS

Like reference numerals will be used to refer to like parts from figure to figure in the following description of the drawings.

DEFINITIONS

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" means that flow from the upstream component enters the downstream component without undergoing a compositional change due to physical fractionation or chemical conversion.

The term "bypass" means that the object is out of downstream communication with a bypassing subject at least to the extent of bypassing.

As used herein, the term "T5" or "T95" means the temperature at which 5 volume percent or 95 volume percent, as the case may be, respectively, of the sample boils using ASTM D-86.

As used herein, the term "initial boiling point" (IBP) means the temperature at which the sample begins to boil using ASTM D-86.

As used herein, the term "end point" (EP) means the temperature at which the sample has all boiled off using ASTM D-86.

As used herein, the term "separator" means a vessel which has an inlet and at least two outlets for separating material entering the inlet to provide streams exiting the outlets.

DETAILED DESCRIPTION

FCC processes for increasing propylene yields can include operation at higher severity with substantial amounts of shape selective catalyst additive. Due to equilibrium constraints, the FCC reactor generates a substantial amount of other olefins, such as butenes and pentenes. By recovering and passing the butenes and pentenes to a secondary, but smaller reactor, the yields of propylene can be increased. The catalyst additive does not generate as much coke on the catalyst that can be burned off in a regenerator to support the endothermic cracking reaction in the secondary reactor. Hence alternative ways for heating the catalyst additive in the secondary reactor are necessary. The process and apparatus for heating catalyst may be used for heating any type of inorganic catalyst for any type of catalytic reaction.

Figure 1:
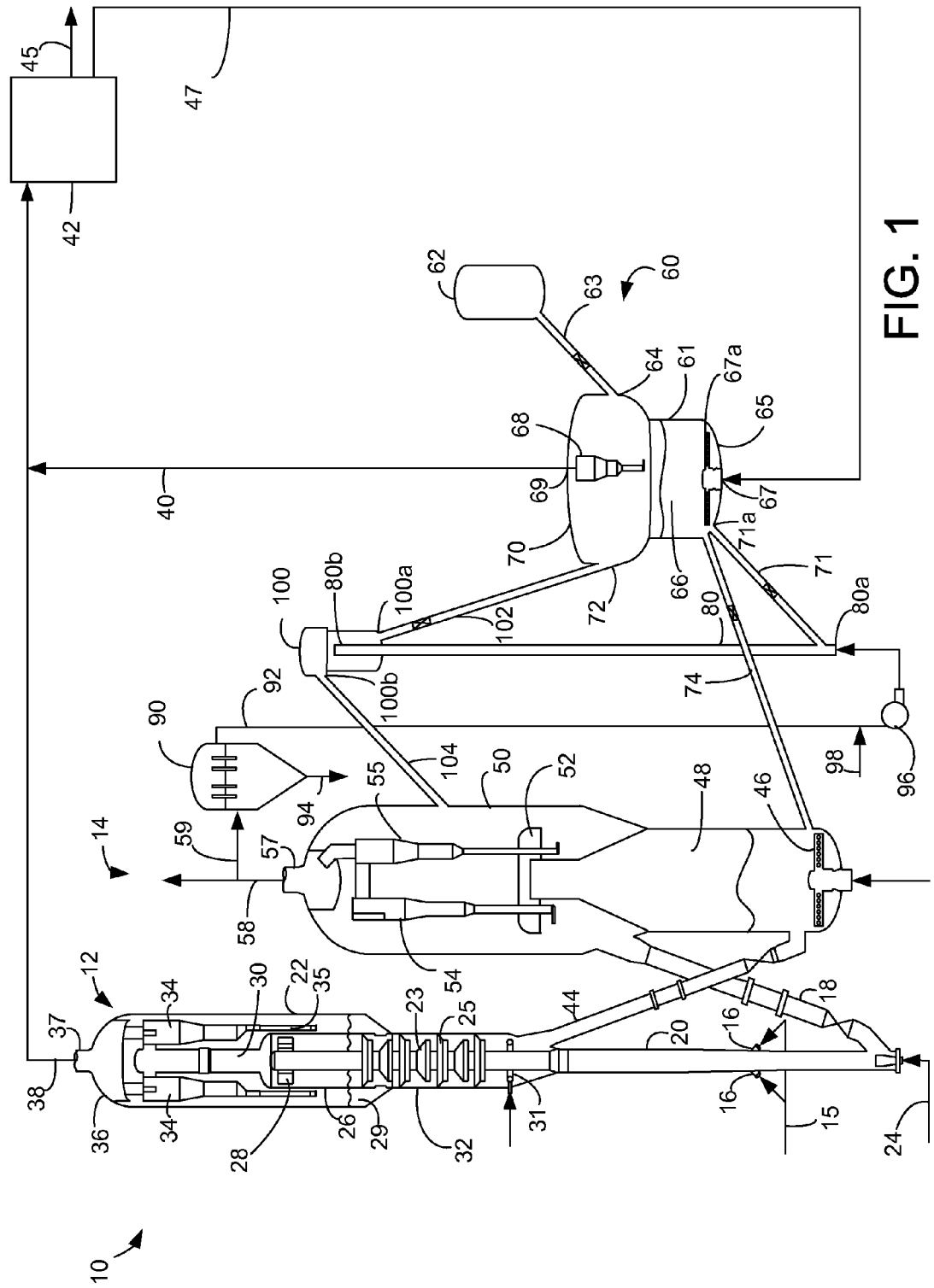
FIG. 1 is a flow scheme for one embodiment of the present invention.

Now turning to FIG. 1, wherein like numerals designate like components, the FIG. 1 illustrates a process and apparatus 10 for fluid catalytic cracking (FCC) and further upgrading. The process and apparatus 10 includes a primary reactor 12, a regenerator 14 and a secondary reactor 60. Process variables in the primary reactor typically include a cracking reaction temperature of 400 to 600° C. and a catalyst regeneration temperature of 500 to 900° C. Both the cracking and regeneration occur at an absolute pressure below 5 atmospheres.

In a typical FCC unit, a heavy, primary hydrocarbon feed stream in a line 15 is distributed by distributors 16 into a riser 20 to be contacted with a newly regenerated cracking first catalyst stream entering from a regenerator conduit 18. This contacting may occur in the narrow riser 20, extending upwardly to the bottom of a reactor vessel 22. The contacting of primary feed and a first catalyst stream is fluidized by gas from a distributor fed by a fluidizing gas line 24. Heat from the first catalyst stream vaporizes the primary hydrocarbon feed, and the hydrocarbon feed is thereafter cracked to lighter molecular weight hydrocarbons in the presence of the catalyst as both are transferred up the riser 20 into the reactor vessel 22.

A conventional FCC feedstock and higher boiling hydrocarbon feedstock are suitable for a fresh, primary hydrocarbon feed stream. The most common of such conventional fresh hydrocarbon feedstocks is a "vacuum gas oil" (VGO), which is typically a hydrocarbon material having a typical boiling range with an IBP of no more than about 340° C. (644° F.), a T5 between about 340° C. (644° F.) to about 350° C. (662° F.), a T95 between about 555° C. (1031° F.) and about 570° C. (1058° F.) and/or an EP of no less than about 570° C. (1058° F.) prepared by vacuum fractionation of atmospheric residue. Such a fraction is generally low in coke precursors and heavy metal contamination which can serve to contaminate catalyst. Atmospheric residue is a another suitable feedstock typically boiling with an IBP of no more than about 340° C. (644° F.), a T5 between about 340° C. (644° F.) and about 360° C. (680° F.) and a T95 of between about 700° C. (1292° F.) and about 900° C. (1652° F.) and/or an EP of no less than about 900° C. (1652° F.) obtained from the bottom of an atmospheric crude distillation column. Other heavy hydrocarbon feedstocks which may serve as fresh, primary hydrocarbon feed include heavy bottoms from crude oil, heavy bitumen crude oil, shale oil, tar sand extract, deasphalted residue, products from coal liquefaction, vacuum reduced crudes. Fresh, primary hydrocarbon feedstocks also include mixtures of the above hydrocarbons and the foregoing list is not comprehensive.

The reactor riser 20 extends upwardly into a reactor vessel 22 as in a typical FCC arrangement. The reactor riser 20 preferably has a vertical orientation within the reactor vessel 22 and may extend upwardly through a bottom of the reactor vessel 22. The reactor vessel 22 may include a disengaging chamber 26.

In an aspect, the reactor riser 20 terminates in the disengaging chamber 26 at exits defined by the end of swirl arms 28. Each of the swirl arms 28 may be a curved tube that has an axis of curvature that may be parallel to a central longitudinal axis of the reactor riser 20. Each swirl arm 28 has one end in downstream communication with the reactor riser 20 and another open end comprising a discharge opening. The swirl arm 28 discharges a mixture of gaseous fluids comprising cracked product gas and solid catalyst particles through the discharge opening. Tangential discharge of product gases and catalyst from the discharge opening produces a swirling helical motion about the cylindrical interior of the disengaging chamber 26. Centripetal acceleration associated with the helical motion forces the heavier catalyst particles to the outer perimeter of the disengaging chamber 26, which then lose momentum and fall. Catalyst particles from the discharge openings collect in the bottom of the disengaging chamber 26 to form a dense catalyst bed 29. The gases, having a lower density than the solid catalyst particles, more easily change direction and begin an upward spiral. The disengaging chamber 26 includes a gas recovery conduit 30 with a lower inlet through which the spiraling gases ultimately travel. The gases that enter the gas recovery conduit 30 will usually contain a light loading of catalyst particles. The inlet recovers gases from the discharge openings as well as stripping gases from a stripping section 32 which may be located in the disengaging chamber 26 as is hereinafter described. The loading of catalyst particles in the gases entering the gas recovery conduit 30 is usually less than 16 kg/m$^3$ (1 lb/ft$^3$) and typically less than 3 kg/m$^3$ (0.2 lb/ft$^3$).

The gas recovery conduit 30 of the disengaging chamber 26 includes an outlet contiguous with an inlet to one or more cyclones 34 that effect a further removal of catalyst particulate material from the gases exiting the gas recovery conduit 30 of the disengaging chamber 26. The cyclones may be directly connected to the gas recovery conduit 30. Typically about 2-30 cyclones are contained in the reactor vessel 22, usually oriented in a circular configuration. Hence, substantially all of the gases and solids exiting the disengaging chamber 26 into the gas recovery conduit 30 enter the cyclones 34. Cyclones 34 create a swirl motion therein to establish a vortex that separates solids from gases. A product gas stream, relatively free of catalyst particles, exits the cyclones 34 through gas conduits into a fluid-sealed plenum 36. The product stream then exits the reactor vessel 22 through an outlet 37 to a primary product line 38 for transport to a product recovery section 42. Each cyclone 28 includes a dip leg 35 for dispensing separated catalyst. The dip legs 35 deliver catalyst to the dense catalyst bed 29 in the disengaging chamber 26. Catalyst solids in the dense catalyst bed 29 enter the stripping section 32 which may be located in the disengaging chamber 26. Catalyst solids pass downwardly through and/or over a series of baffles 23, 25 in the stripping section 32. A stripping fluid, typically steam, enters a lower portion of the stripping section 32 through at least one distributor 31. Counter-current contact of the catalyst with the stripping fluid over the baffles 23, 25 displaces product gases adsorbed on the catalyst as it continues downwardly through the stripping section 32. A first stream of stripped catalyst from the stripping section 32 from the primary reactor 12 may pass through a conduit 44 and be provided to a catalyst regenerator 14. In the regenerator 14, coke deposits are combusted from the surface of the catalyst by contact with an oxygen-containing gas at high temperature to produce a regenerated first catalyst stream and a first flue gas stream. Following regeneration, the regenerated first catalyst stream is delivered back to the bottom of the riser 20 through a conduit 18.

The catalyst-to-oil ratio, based on the weight of catalyst and feed hydrocarbons entering the bottom of the riser, may range up to 25:1 but is typically between about 3:1 and about 10:1. Hydrogen is not intentionally added to the riser. Steam may be passed into the riser to effect catalyst fluidization and feed dispersion. The average residence time of catalyst in the riser may be between about 0.5 and about 5 seconds. The type of catalyst employed in the process may be chosen from a variety of commercially available catalysts. A catalyst comprising a zeolite based material is preferred, but the older style amorphous catalyst may be used if desired. The bulk of the FCC catalyst comprises Y-type zeolite, but a shape selective catalyst additive may also make up the FCC catalyst. Suitable catalyst additive is selected from one or more of an MFI, such as ZSM-5 and ST-5, MEL, MWW, beta, erionite, ZSM-34, SAPO-11, non-zeolitic amorphous silica-alumina, chabazite and mordenite. A preferred catalyst additive is an MFI.

The FIG. 1 depicts a regenerator 14 known as a combustor. However, other types of regenerators are suitable. In the catalyst regenerator 14, a stream of oxygen-containing gas, such as air, is introduced from a line through an air distributor 46 to contact the spent catalyst in a first, lower chamber 48. The stream of oxygen-containing gas combusts coke deposited on the catalyst and provides regenerated catalyst and flue gas. The catalyst regeneration process adds a substantial amount of heat to the catalyst, providing energy to offset the endothermic cracking reactions occurring in the riser 20. Catalyst and air flow upwardly together along a combustor riser located within the catalyst regenerator 14 and, after regeneration, are initially disengaged by discharge into an upper chamber 50 through a disengager 52. Finer separation of the regenerated catalyst and flue gas exiting the disengager 52 is achieved using first and second stage separator cyclones 54, 55, respectively, within the upper chamber 50 of the catalyst regenerator 14. Catalyst separated from flue gas dispenses through dip legs from cyclones 54, 55 while flue gas relatively lighter in catalyst sequentially exits cyclones and is discharged from the regenerator vessel 14 through a flue gas outlet 57 in a flue gas line 58.

Regenerated catalyst may be recycled back to the primary reactor 12 through the regenerator conduit 18. The riser 20 of the primary reactor 12 may be in downstream communication with the regenerator 14. As a result of the coke burning, the flue gas vapors exiting at the top of the catalyst regenerator 14 through the flue gas outlet 57 contain $SO_x$, $NO_x$, $CO$, $CO_2$, $N_2$, $O_2$ and $H_2O$, along with smaller amounts of other species.

The FCC primary product gas in the primary product line 38 may be joined by a secondary product stream in a secondary product line 40 and together be sent to a product recovery section 42. The product recovery section 42 may include several separation unit operations to generate several product streams represented by product line 45 and a secondary feed stream in secondary feed line 47. The secondary feed stream may comprise C4 and C5 hydrocarbons and may include a large proportion of C4 and C5 olefins. The secondary feed stream 44 may be fed to the secondary reactor 60.

The secondary reactor 60 may comprise a bubbling bed reactor, a slow fluidized bed reactor, a fast fluidized bed reactor or a fixed bed reactor. The secondary reactor 60 may comprise a reactor vessel 61 having a reactive lower section 65 which may contain a catalyst bed 66 comprising a dense phase of catalyst and a disengaging upper section 70 which may contain a dilute phase of catalyst. The upper section 70 may have a larger diameter, cross sectional area or volume than the lower section 65. The reactor vessel 61 may comprise a feed inlet 67 to the lower section 65, a catalyst outlet 71*a* in the lower section 65 to a cooled catalyst outlet conduit 71 and a hot catalyst inlet 72 and a fresh catalyst inlet 64 to the upper section 70 of the reactor vessel 61. The hot catalyst inlet 72 and the fresh catalyst inlet 64 are above the catalyst outlet 71*a* in the reactor vessel 61.

The secondary feed stream in secondary feed line 47 comprising a hydrocarbon stream may be passed to the reactor vessel 61 to react over a catalyst bed in the reactor vessel 61 to produce a secondary product gas. The secondary feed stream may be distributed to the lower section 65 of the secondary reactor from the feed inlet 67 through a distributor 67*a*. The secondary feed may be distributed from below a bulk of the catalyst bed 66. In an aspect, the secondary feed line 47 may be olefinic such as comprising C4 and C5 olefins that pass through the catalyst bed 66 in the secondary reactor 60 and crack to olefinic products such as C2 and C3 olefins. The secondary hydrocarbon feed stream may be derived from a primary product gas stream in line 38 of the primary reactor 12 that is in downstream communication with the regenerator 14.

A stream of fresh catalyst from a fresh catalyst feed hopper 62 may be passed to the secondary reactor 60 through a fresh catalyst conduit 63. The fresh catalyst stream gradually becomes used as the catalyst moves downwardly through the lower section 65 of the reactor vessel 61. Due to endothermic reactions in the secondary reactor 60, a relatively cooled second catalyst stream is withdrawn from the reactor vessel 61 through an outlet 71*a* in the lower section 65 to a cooled catalyst outlet conduit 71. In an aspect, the cooled second catalyst stream is withdrawn from the lower section 65 of the reactor vessel 61. The rate at which the cooled catalyst stream is withdrawn through a control valve on the cooled catalyst outlet conduit 71 and heated catalyst is returned to the secondary reactor 60 in conduit 102 is determined by the catalyst to oil ratio for maintaining the temperature in the secondary reactor 60. The catalyst to oil ratio may be adjusted to be within about 3:1 to about 10:1 range.

A product gas stream may pass upwardly from the feed inlet 67 in the lower section 65 to the upper section 70 and roughly disengage from the dense phase of catalyst in the larger volume upper section 70. The secondary product gas stream may pass to a cyclone 68 in the upper disengaging section 70 of the secondary reactor 60 where the catalyst is further separated from the secondary product stream. More cyclones 68 are contemplated in the upper section 70. Additionally, the cyclone 68 or a plurality thereof may be located outside of the reactor vessel 61 but essentially operate very similar to the internal cyclone 68 in the FIG. 1. The product gas stream and the cooled second catalyst stream may be withdrawn from the reactor vessel 61 separately. The product gas stream may be withdrawn from the reactor vessel 61 in an aspect from the upper section 70 through the product outlet 69 in the upper section 70 from the cyclone 68. The secondary product gas stream may be withdrawn from the reactor vessel 61 in line 40 and be forwarded to the product recovery section 42 in line 38 with or separately from the primary product stream.

The secondary reactor 60 may use a catalyst that is the catalyst additive used in the primary reactor 12. Suitable catalyst is selected from one or more of an MFI, such as ZSM-5 and ST-5, MEL, MWW, beta, erionite, ZSM-34, SAPO-11, non-zeolitic amorphous silica-alumina, chabazite and mordenite. The preferred catalyst is an MFI. The secondary reactor 60 does not need additional catalyst for high propylene production, but fresh makeup catalyst will be necessary to make up for attrition losses in the secondary reactor 60 during operation. However, this is a relatively small amount of fresh make up catalyst added per day on the basis of total catalyst in the system to maintain a constant level of activity. Make up catalyst can also be added to make up for catalyst passed to the primary reactor 12 such as in conduit 74 and through regenerator 14.

The secondary reactor 60 is decoupled from the conditions in the primary reactor 12, so the reaction conditions can be optimized independently, to maximize yield of ethylene and propylene without constraint from the primary reactor 12. As a result, high ethylene and propylene yields can be achieved from the secondary reactor 60 in a single pass.

Unlike in the primary reactor 12 comprising an FCC riser 20, the catalyst density in this secondary reactor 60 is much higher, and can be at least 10 times higher, particularly in the lower section 65 of the reactor vessel 61. Hence, the reactor size is much smaller than a second FCC riser for the same purpose. Moreover, unlike a fixed bed reactor such as in an olefin cracking process, dual reactors loaded with special catalyst are not needed to maintain a continuous operation during catalyst regeneration. The secondary reactor 60 like the primary reactor 12, will be operated at low pressure, 170 to 210 kPa (absolute) and high temperature of about 580-650° C. Therefore, total high propylene yield such as at least 26 wt % on VGO in feed line 15 and ethylene yield such as at least 10 wt % on VGO in line 15 can be achieved in integrated process and apparatus 10 with typical VGO feedstock. Although the secondary reactor 60 is integrated with the primary reactor 12 of the FCC unit, the FCC unit can be operated in other modes such as in a gasoline mode by shutting down the secondary reactor 60.

The catalyst in the catalyst bed 66 must be kept hot to promote an endothermic cracking reaction. The catalyst becomes cooler through catalysis of the endothermic reaction. To heat the catalyst, a portion of the used, cooler second catalyst stream in the cooled catalyst outlet conduit 71 is passed to a heating riser 80, passed up the riser and heated by contact with a hot gas after which the heated catalyst is passed back to the reactor vessel 61. The cooled catalyst outlet conduit 71 directly communicates the catalyst outlet 71*a* of the reactor vessel 61 with the heating riser 80. The heating riser 80 has a first, lower end 80*a* and a second higher end 80*b*. The heating riser 80 may be in direct communication with the catalyst outlet 71*a* and a source of hot gas at the first end 80*a*. The source of hot gas may be a source of one or more gasses comprising nitrogen, steam, air, fuel oil, paraffins or flue gas from the regenerator 14.

Another portion of the stripped, cooler second catalyst stream may be passed to the regenerator 14 through a make-up catalyst conduit 74 controlled by a slide valve. The rate of catalyst in catalyst conduit 74 may serve to transfer make up catalyst to the primary reactor 12 via the regenerator 14 or directly.

In an embodiment, the source of hot gas is the regenerator 14, and the hot gas stream is a flue gas stream from an FCC regenerator. The flue gas in line 58 from the regenerator 14 can be at a temperature of about 1200° F. (650° C.) to about 1400° F. (760° C.). A diverted portion of the flue gas stream in line 59 may be filtered before it heats the second catalyst stream. In an embodiment, a TSS that is not shown and/or a filter 90 can be provided to further remove catalyst from flue gas that exits the regenerator 14 and is transported in the flue gas line 59. In the embodiment of FIG. 1, the filter 90 is in downstream communication with the regenerator 14. The filter 90 may comprise a single barrier filter. In an embodiment, the filter 90 comprises a barrier filtration vessel that includes a tube sheet through which a plurality of barrier elements extends. The dirty flue gas stream in line 59 may enter the barrier filtration vessel below the tube sheet. The barrier elements may comprise tubes or cylinders of sintered metal, ceramic or fabric that block solids but allow gas to travel from one end of the barrier element on one side of the tube sheet, across the tube sheet to the other end of the barrier element on the other side of the tube sheet. The barrier elements typically have a closed bottom end and an outlet in the top end for the separated, filtered gas. Filtered flue gas exits the filter 90 in a filtered flue gas line 92 while catalyst particles are removed in line 94 to be further collected for disposal. The filtered flue gas may be compressed in a blower 96 and passed to the first end 80*a* of the heating riser 80. The temperature of the flue gas passed to the riser 80 is 1250 to 1400° F. and the temperature of the cooled second catalyst stream is 1000 to 1200° F.

It is also contemplated that one or more of nitrogen, steam, air, fuel oil or paraffins may be added to the flue gas stream in line 98. Air will help to burn coke off the catalyst in the riser 80. However, coke on the catalyst can be insufficient to provide enough heat to the catalyst for the secondary reactor 70. Additional fuel oil or paraffins can be co-fed with the air to generate additional heat to bring the catalyst temperature up to the reactor inlet temperature. Air and hydrocarbon can be metered to the heating riser in measure to control the catalyst activity which can adjust the ethylene to propylene yield ratio. The heating of the catalyst by heat exchange will be greater than by combustion of coke in the heating riser 80. The hot gas superficial velocity in the riser 80 should be in the transport mode of at least 6 m/s.

The hot gas stream propels the second catalyst stream up the riser 80. The hot gas stream and the cooled catalyst ascend in the riser 80 from the first end 80*a* to the second end 80*b*. During the ascension, the catalyst is heated to about 1100 to about 1400° F. at the second end 80*b* of the heating riser. The heated second catalyst stream and the hot gas stream exit the second end 80*b* of the heating riser 80 into a disengager 100. The disengager 100 is in downstream communication with the heating riser 80 at a second end of the riser. In the disengager 100, the heated catalyst and the hot gas are disengaged from each other. A catalyst inlet conduit 102 directly communicates the disengager 100 to the reactor vessel 61. The catalyst inlet conduit 102 connects to a lower outlet 100*a* of the disengager 100 and directly communicates the disengager to the catalyst inlet 72. The catalyst inlet 72 is in downstream communication with the disengager 100. The catalyst inlet conduit 102 transfers the separated heated catalyst from the disengager 100 directly to the reactor vessel 61, in an aspect to the upper section 70.

The separated hot gas accumulates in the top of the disengager 100. A hot gas conduit 104 may communicate the disengager 100 with the regenerator 14 to transport hot gas from the disengager 100 to the regenerator 14. The hot gas exits the disengager 100 in an upper outlet 100b which is above the lower outlet 100a. In an aspect, the separated hot gas may be passed to the upper chamber 50 of the regenerator 14.

In an additional embodiment, at least a portion of the heating riser 80 may be contained in the catalyst regenerator 14. In such an embodiment, the disengager 100 may also be located in the regenerator 14. It is also contemplated that the disengager 100 comprise a side inlet that is disposed tangentially to a cylindrical side of the disengager 100, but this embodiment is not shown in FIG. 1.

Figure 2:
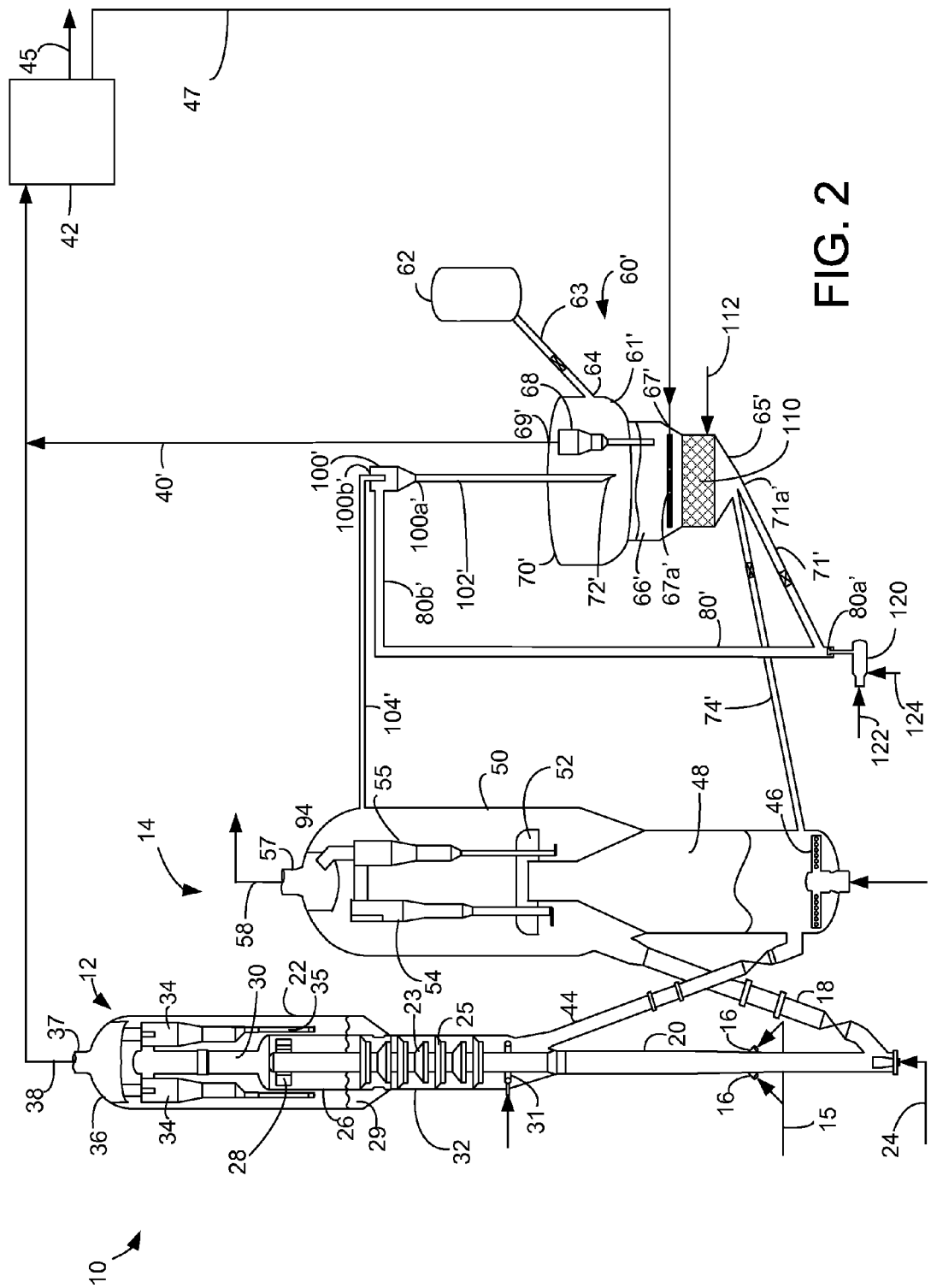
FIG. 2 is a flow scheme for another embodiment of the invention of FIG. 1.

A second embodiment is shown in FIG. 2 which uses a heater such as a direct fired air heater 120 to provide hot gas to the heating riser 80'. FIG. 2 shows an alternative embodiment of a second reactor 60'. Elements in FIG. 2 with the same configuration as in FIG. 1 will have the same reference numeral as in FIG. 1. Elements in FIG. 2 which have a different configuration as the corresponding element in FIG. 1 will have the same reference numeral but be designated with a prime symbol (').

The reactor vessel 61' includes a lower stripping section 110 in its lower section 65' below the catalyst bed 66' and the feed distributor 67a'. An inert stripping gas 112 such as steam is injected into the stripping section 110 to strip hydrocarbons from the cooled catalyst. Stripped, cooled catalyst leaves the bottom of the reactor vessel 61' in a cooled catalyst outlet conduit 71' through an outlet 71a'. A portion of the stripped cooled catalyst may be passed to the regenerator 14 through a make-up catalyst conduit 74' controlled by a slide valve. The stripped, cooled catalyst is delivered to the heating riser 80' at a lower end 80a'.

The direct fired air heater 120 receives a hydrocarbon stream 122 and an air Stream 124 which combust in the heater 12 to generate hot combustion gas which is fed to the heating riser 80' at the lower end 80a'. The hot gas and the cooled second catalyst stream ascend in the riser 80' to an upper end 80b' which may take a perpendicular turn and enter a disengager 100' tangentially to a cylindrical side of the disengager 100'. The catalyst is heated by the hot gas and the heated catalyst and combustion gas disengage in the disengager 100'. The combustion gas exits the disengager 100' through an upper outlet 100b' and travels through the hot gas conduit 104' and enters the regenerator 14. The heating of the catalyst by heat exchange will be greater than by combustion of coke in the heating riser 80'. The heated second catalyst stream exits the disengager 100' through a lower outlet 100a' and enters the reactor vessel 61' through a heated catalyst conduit 102' which may be a dip leg which returns the second catalyst stream to the catalyst bed 66' through a catalyst inlet 72'. Product gas leaves the reactor vessel 61' through a product outlet 69' and enters a secondary product line 40'.

Figure 3:
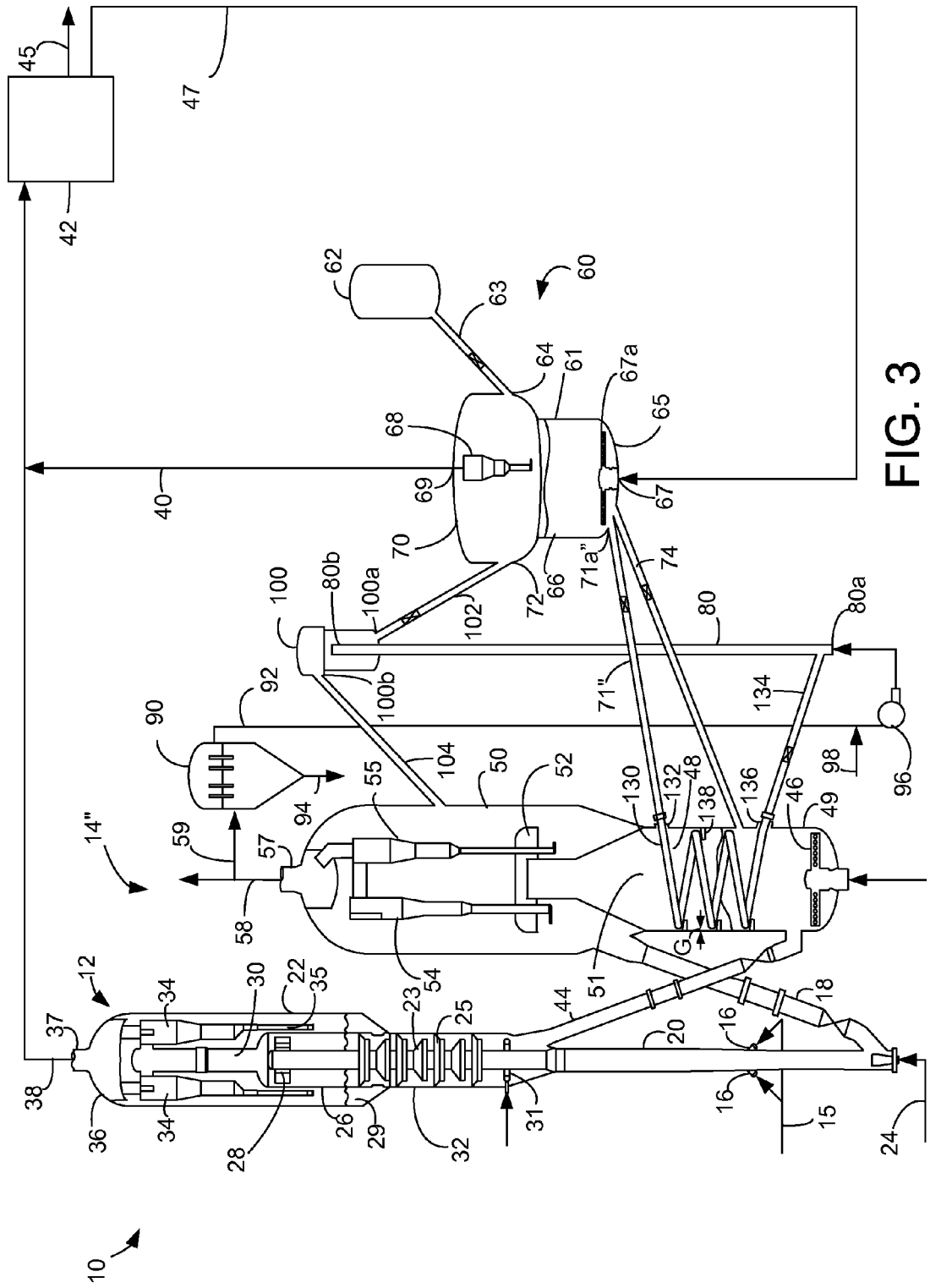
FIG. 3 is a flow scheme for another embodiment of the present invention.

A third embodiment is shown in FIG. 3 which heats catalyst in the regenerator 14. FIG. 3 shows an embodiment of a second reactor 60. Elements in FIG. 3 with the same configuration as in FIG. 1 will have the same reference numeral as in FIG. 1. Elements in FIG. 3 which have a different configuration as the corresponding element in FIG. 1 will have the same reference numeral but designated with a double prime symbol (").

The reactor of FIG. 3 may be the same as described in FIG. 1. A catalyst outlet conduit 71" is in direct, downstream communication with the catalyst outlet 71 a" for withdrawing a second catalyst stream from the reactor vessel 61. The catalyst that has been used in the secondary reactor will have been cooled by endothermic reactions and is in need of heating. A heating tube 130 is in downstream communication with the catalyst outlet conduit 71" and is positioned in the catalyst regenerator 14". The heating tube 130 extends through an interior 51 of the catalyst regenerator 14". Specifically, the heating tube 130 is positioned within or inside the wall(s) 49 of the regenerator 14". The heating tube 130 can comprise a coil that winds around an interior 51 of the regenerator.

The second catalyst stream from the reactor 61 is passed from the catalyst outlet conduit 71" through the heating tube positioned in the regenerator 14" for the FCC reactor 12. The second catalyst stream is heated by indirect heat exchange with heat and combustion gases generated while regenerating spent catalyst from the FCC reactor 12. A regenerator outlet conduit 134 conduit withdraws heated catalyst from the heating tube 130 in the regenerator 14. The catalyst inlet 72 is in downstream communication with said heating tube 130 for passing the heated second catalyst stream to the reactor vessel 61. The catalyst inlet 72 to the reactor vessel 61 is above the catalyst outlet 71a.

The second catalyst stream flows to the regenerator 14". The catalyst outlet conduit 71" connects to the heating tube 130 at a joint and the heating tube enters the regenerator 14" through the wall 49 at an entry 132. The regenerator may be a cold wall regenerator with a refractory lining along an inner surface of the wall 49. The heating tube 130 may have a booted connection to the regenerator 14" with a stainless steel sleeve. The heating tube 130 may coil around an interior 51 of the regenerator 14" just at the inner perimeter of the refractory lining with a gap G between the outer diameter of the heating tube 130 and the inner surface of the wall 49 to accommodate thermal differential growth. The heating tube 130 can be supported at different levels and still have a hard connection at an outlet 136. Supports 138 allow the coiled heating tube 130 to slide radially on a top side of the supports. The flexible nature of the coiled heating tube 130 allows for the system to remain contained and attached to the wall 49 at two different locations at the entry 132 and the outlet 136. Because the coiled heating tube is wound at the inner perimeter of the regenerator 14", the length of heating tube 130 and the degree of heat exchange can be significant. Although the heating tube 130 is shown to be a single pipe design it can also comprise a cluster of pipes banded together and comprise more than one pipe with additional entries 132 or outlets 136. In the embodiment of FIG. 3, the heating tube 130 is in the lower chamber 48, but it may be disposed in the upper chamber 50.

Figure 4:
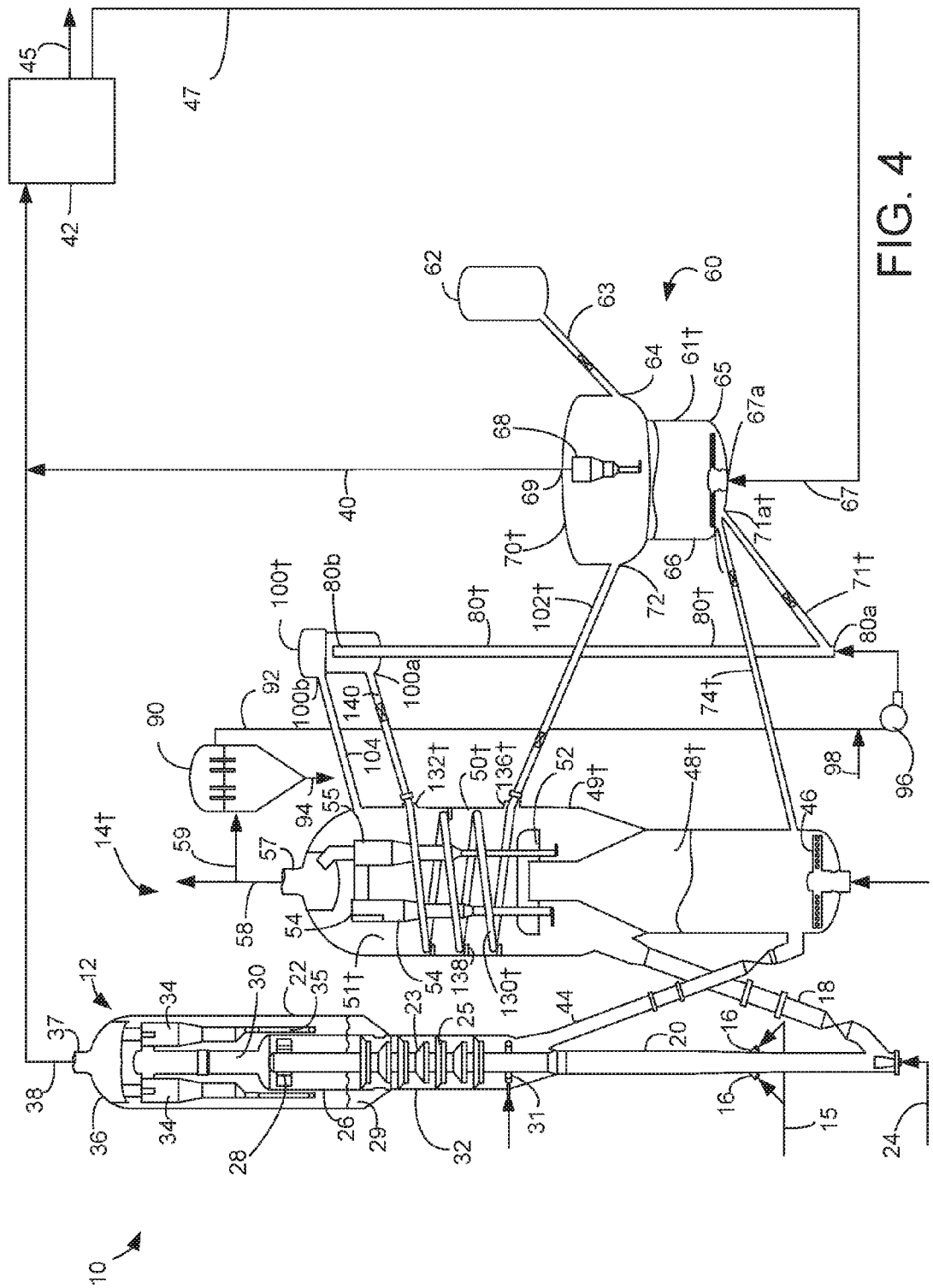
FIG. 4 is a flow scheme for another embodiment of the invention of FIG. 3.

A fourth embodiment is shown in FIG. 4 which heats catalyst in the regenerator 14†. Elements in FIG. 4 with the same configuration as in FIG. 3 will have the same reference numeral as in FIG. 3. Elements in FIG. 4 which have a different configuration as the corresponding element in FIG. 3 will have the same reference numeral but designated with a cross symbol (†).

In FIG. 4, the riser 80† is in direct, downstream communication with a catalyst outlet conduit 71† and a heating tube 130† is downstream communication with the riser 80†. The heating tube 130† may be positioned in the upper chamber 50†. The riser 80† may be in direct, downstream communication with the catalyst outlet conduit 71†. A cooled second catalyst stream from the catalyst outlet conduit 71† enters the lower end 80a of the riser 80†. A lift gas as described with respect to FIG. 1 may lift the catalyst stream from the lower end 80a to an upper end 80b to an elevation at least as high as an entry 132† to the regenerator 14† of the heating tube 130†. A disengager 100† at a top end 80b of the riser 80t disengages gas from the second catalyst stream. The second catalyst stream may be returned from a lower outlet 100a of the disengager 100† in a regenerator catalyst conduit 140 to the heating tube 130†. As explained with respect to FIG. 3, the regenerator 14 may have a lower chamber 48 and an upper chamber 50. In the embodiment of FIG. 4, the heating tube 130† is positioned in the upper chamber 50†, but it may be disposed in the lower chamber 48†. A heated second catalyst stream is returned to the reactor vessel 61† of the secondary reactor 70† through the catalyst inlet conduit 102†. With these exceptions, FIG. 4 operates the same as in FIG. 3.

Figure 5:
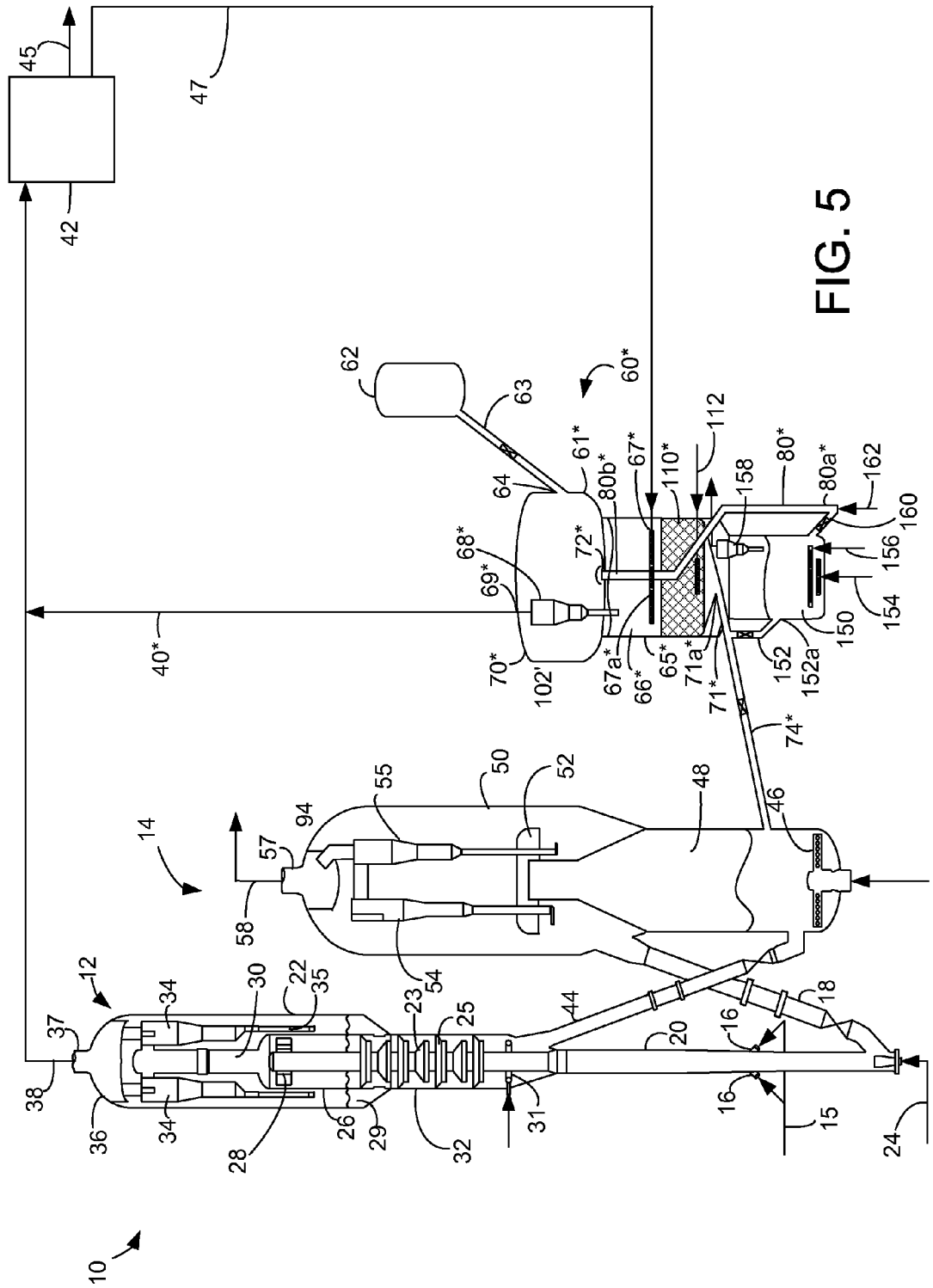
FIG. 5 is a flow scheme for a further embodiment of the present invention.

A fifth embodiment is shown in FIG. 5 in which the reactor vessel 61* includes a heating chamber 150 which heats catalyst. Elements in FIG. 5 with the same configuration as in FIG. 1 will have the same reference numeral as in FIG. 1. Elements in FIG. 5 which have a different configuration as the corresponding element in FIG. 1 will have the same reference numeral but designated with an asterisk symbol (*).

The secondary reactor 60* comprises a reactor vessel 61* comprising a hydrocarbon feed inlet 67*, a catalyst outlet 71a* in the reactor vessel 61*, a product outlet 69* in the reactor vessel and a catalyst inlet 72* to the reactor vessel. The catalyst inlet 72* is located at the end of the conduit, not where the conduit enters the reactor vessel 61*. The secondary reactor vessel 61* includes a lower section 65* and an upper section 70*. The secondary hydrocarbon feed from secondary feed line 51 which may be derived from the primary products from the primary reactor 12 is passed from inlet 67* to the reactor vessel 61* to contact hot catalyst from the catalyst inlet 72* in a catalyst bed 66* in the lower section 65*. The feed preheat and the endothermic heat of reaction are supplied by circulation of the catalyst stream at a catalyst-to-oil ratio be between 3 and 12 from the reactor vessel 61* to the heating chamber 150. Contacting produces a product gas that is withdrawn from the upper section 70* in the reactor vessel 61* through a product outlet 69* which may be through a cyclone 68* into a secondary product line 40*.

The reactor vessel 61* may include a lower stripping section 110* in a lower section 65* below the catalyst bed 66* and the feed inlet 67* that may supply the secondary hydrocarbon feed to a feed distributor 67a*. The feed inlet 67* is preferably above the catalyst outlet 71a*. An inert stripping gas 112 such as steam may be injected into the stripping section 110* to strip hydrocarbons from the cooled, used catalyst. The stripping section 110* may include stripper packing or trays. A stripped, cooled catalyst stream may be withdrawn from a bottom of the reactor vessel 61* in catalyst outlet conduit 71* through the catalyst outlet 71a*. A portion of the stripped, cooled catalyst may be passed to the regenerator 14 through a make-up catalyst conduit 74* controlled by a slide valve.

The reactor vessel 61* may be located above a heating chamber 150. The heating chamber 150 may be disposed below the reactor vessel 61* in direct communication with the catalyst outlet 71a* and a catalyst outlet conduit 71*. The catalyst outlet conduit 71* may transport the cooled catalyst stream that has been used in the reactor vessel 61* and optionally stripped in a stripping section 110* to the make-up catalyst conduit 74* and to the heating chamber inlet conduit 152 at rates governed by their respective control valves. The stripped, cooled catalyst stream may be passed from the reactor vessel 61* to the heating chamber 150 through a heating chamber inlet 152a. The product gas stream is withdrawn from the product outlet 69* from the reactor vessel 61*, and the second catalyst stream is withdrawn from the catalyst outlet 71a* from the reactor vessel 61*, separately.

The heating chamber 150 may also be in downstream communication with a source of gas at a lower end such as hot flue gas from the regenerator 14, a hydrocarbon stream, a combustion gas stream from a fired heater or turbine and/or an oxygen stream such as air. Alternatively, torch oil may be added to the heating chamber 150 such as by adding torch oil (not shown) to the catalyst stream in the heating chamber inlet conduit 152. In the embodiment of FIG. 5, the gas is a hydrocarbon stream in line 154 from a fuel gas source and an air stream in line 156 from an air source which are fed to the heating chamber 150 through respective distributors. The hydrocarbon stream and oxygen may combust to provide a hot gas stream to heat the catalyst in the heating chamber. Flue gas from the regenerator may also be added to the heating chamber in addition to a hydrocarbon stream and/or an oxygen stream. If torch oil is used in the heating chamber 150, air from an air source must be added to the heating chamber 150 also such as in line 156. Flue gas may be removed from the heating chamber 150 via a cyclone 158 or other means and fed to the regenerator 14 or to the flue gas line 58. A heated catalyst stream at a temperature of about 1250 to about 1325° F. may be withdrawn from the lower end of the heating chamber 150 through a heated outlet conduit 160 and be passed to a riser 80* to be returned to the reactor vessel 61*. The heating of the catalyst by heat exchange will be greater than by combustion of coke on catalyst in the heating chamber 150. The riser 80* is in downstream communication with said heating chamber 150 at a first end 80a*. The heated catalyst stream is passed up the riser 80* to the reactor vessel 61*. A gas from line 162 may be used to propel the heated catalyst stream up the riser 80* from the first end 80a* to the second end 80b*. The gas may be steam, even a vaporous secondary feed stream or flue gas from the regenerator 14. The second end 80b* of the riser 80* may comprise the catalyst inlet 72*to the reactor vessel 61*. The catalyst inlet 72* may be equipped with a ballistic disengaging dome to assist in the separation of catalyst from gas exiting the riser 80*. The larger upper section 70* of the reactor vessel 61* may provide a disengaging section in which catalyst disengages from product gas and stripping gas above the feed inlet 67* in the reactor vessel 61*. The catalyst inlet 72* is in downstream communication with the second end 80b* of the riser 80*.

Figure 6:
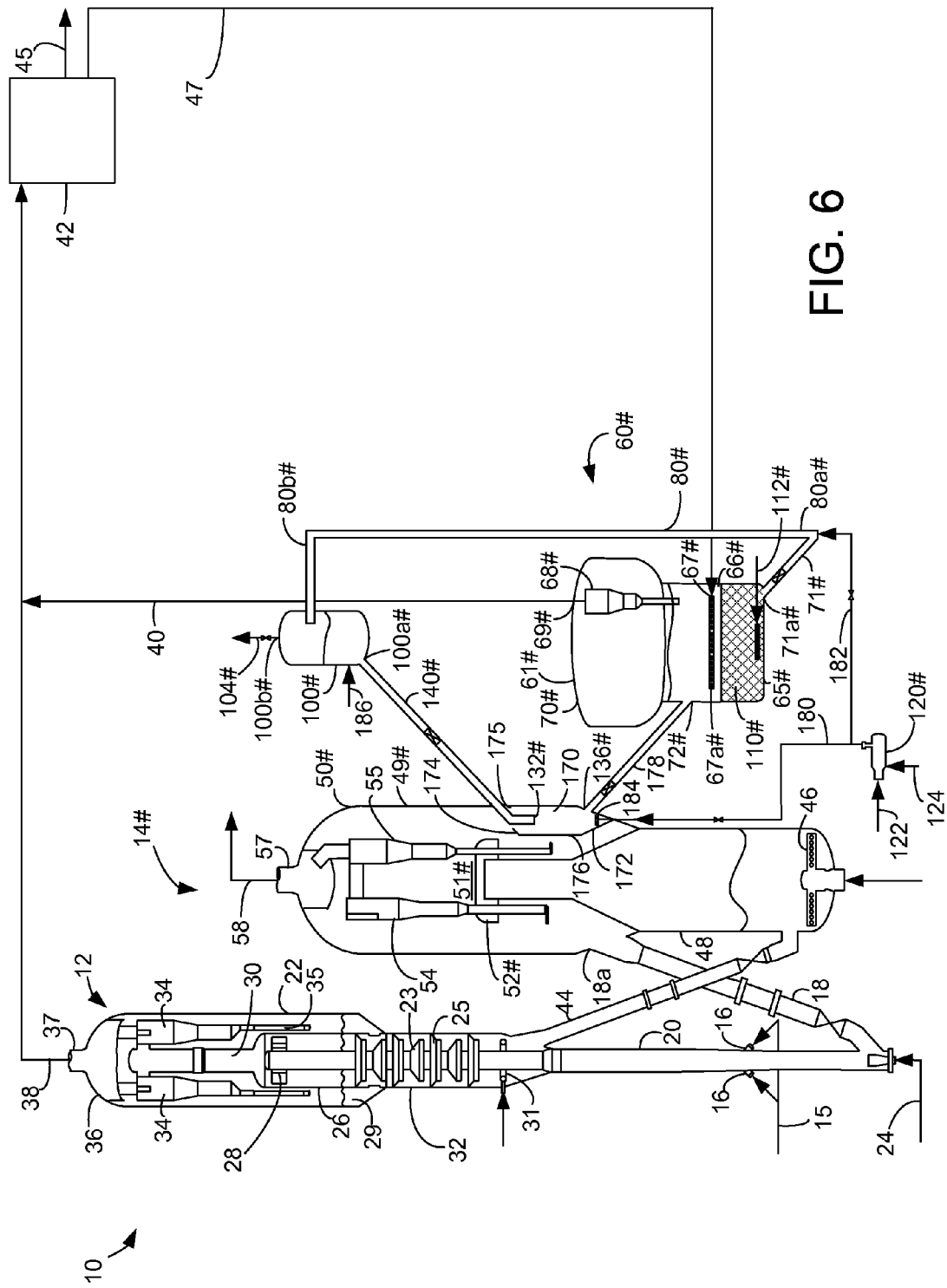
FIG. 6 is a flow scheme for an even further embodiment of the present invention.

A sixth embodiment is shown in FIG. 6 in which the second catalyst stream from the reactor vessel 61# is heated in the regenerator 14# although isolated from the first catalyst stream in the regenerator. Elements in FIG. 6 with the same configuration as in FIG. 1 or 3 will have the same reference numeral as in FIG. 1. Elements in FIG. 6 which have a different configuration as the corresponding element in FIG. 1 or 3 will have the same reference numeral but be designated with a hash tag symbol (#).

In the embodiment of FIG. 6, the regenerator 14# regenerates a first catalyst stream from the primary reactor 12 provided to the regenerator through the spent catalyst conduit 44 to produce a regenerated first catalyst stream and a first flue gas stream. The regenerator 14# is in downstream communication with the primary reactor 12 which may be an FCC reactor. The regenerated first catalyst stream is withdrawn from the regenerator 14# through the regenerated catalyst conduit 18 through a first regenerated catalyst outlet 18a.

A secondary reactor 60# comprises a reactor vessel 61# with a feed inlet 67#, a catalyst outlet 71a# in the reactor vessel and a catalyst inlet 72# to the reactor vessel above the catalyst outlet 71a#. A secondary hydrocarbon feed stream in line 47 is passed to the reactor vessel 61# through feed inlet 67# distributed by a distributor 67a#. The secondary hydrocarbon feed stream is derived from a product of the primary FCC reactor 12 which is in upstream and downstream communication with the regenerator 14#. The reactor vessel 61# is in downstream communication with the primary FCC reactor at the feed inlet 67#.

The secondary feed stream reacts over a catalyst bed 66# in the reactor vessel to produce a secondary product gas that may be withdrawn through line 40 from outlet 69#. A cyclone 68# in the upper section 70# may separate product gas from entrained second catalyst. A second catalyst stream may be withdrawn from catalyst outlet 71a# to the catalyst outlet conduit 71#. The second catalyst stream may be stripped in a stripping section 110# with an inert gas such as steam from line 112# before it is withdrawn from the reactor vessel 61#. The second catalyst stream is passed from the reactor vessel 61# to the regenerator 14# for heating.

A hopper 170 in the regenerator 14# is in downstream communication with the catalyst outlet 71a#. The regenerator 14# comprises a lower chamber 48 and an upper chamber 50#, and the hopper may be in either chamber. In the embodiment of FIG. 6, the hopper 170 is in the upper chamber 50#. The hopper 170 has a bottom closed 172 to an interior 51# of the regenerator 14# and a top 174 that is open to the interior of the regenerator. In other words, the top 174 defines an opening 175 in the hopper 170. The hopper 170 may also include a side wall 176 that is closed to an interior 51# of the regenerator. The side wall 176 may cooperate with the wall of the regenerator to laterally define the hopper 170. In FIG. 6, the hopper 170 is disposed adjacent to the wall 49# of the regenerator, so the wall contributes to the physical boundaries of the bottom 172 and the side wall 176 of the hopper 170. The top 174 may be angled and extend outwardly away from the disengager 52# that distributes the first catalyst stream to the interior 51# to prevent the first catalyst stream from the disengager 52# from entering the hopper 170.

The hopper 170 isolates the second catalyst stream from the first catalyst stream in the regenerator 14#. The isolation is not complete because some catalyst may leak into the interior 51# of the regenerator 14# through the open top 174. However, the leakage will be minimal. The second catalyst stream is heated in the regenerator 14# to produce a heated second catalyst stream. The second catalyst stream may be heated by absorbing heat from the heat generated in the regenerator 14# by regenerating the first catalyst stream. The second catalyst stream may not contain enough coke to provide sufficient heat of combustion to heat the second catalyst stream adequately, but it may have some coke that will undergo combustion to provide a second gas stream that will escape the open top 174. The second gas stream may mix with the first flue gas stream and exit the regenerator 14# together through a single flue gas outlet 57 in line 58. The heated second catalyst stream is withdrawn from the regenerator 14# through a regenerator outlet 136# in the hopper 170 separately from the outlet 18a for the regenerated first catalyst stream. A return conduit 178 passes the heated second catalyst stream to the reactor vessel 61# through the catalyst inlet 72#. The catalyst inlet 72# to the reactor vessel 61# is in downstream communication with the hopper 170.

The second catalyst stream may be heated with a hot gas stream in the regenerator 14#. The hot gas stream may be heated in a heater 120# located outside of the regenerator 14#. In an aspect, a direct fired air heater 120# receives a hydrocarbon stream 122 and an air stream 124 which combust in the heater 120# to generate a hot air stream which is passed by line 180 to a distributor 184 in the hopper 170. The hopper 170 is in downstream communication with the heater 120#. The distributor 184 distributes hot gas to the second catalyst stream in the hopper 170 to heat the second catalyst stream. The hot gas provided during heating leaves the hopper 170 through the opening 175 in the open top 174 and mixes with the first flue gas stream which both exit the regenerator 14# together through the outlet 57.

A riser 80# may be in downstream communication with the catalyst outlet 71a# through the catalyst outlet conduit 71 #. The second catalyst stream withdrawn from the reactor 61# passes through the catalyst outlet conduit 71# and enters the riser 80# at a first end 80a#. The second catalyst stream withdrawn from the reactor vessel 61# may ascend up the riser 80# before it is passed to the regenerator 14#. The riser 80# is in downstream communication with the catalyst outlet 71a# at the first end 80a#. The riser 80# may also be in downstream communication with a source of gas at the first end 80a# for propelling the first catalyst stream up the riser 80# to a second end 80b#. The second catalyst stream may be propelled up the riser 80# with a hot air stream from the air heater 120#. A branch line 182 from line 180 may deliver hot air to the riser 80# from the air heater 120#. The riser 80# may be in downstream communication with the air heater 120# at the first end 80a#, and the hopper 170 may be in downstream communication with the second end 80b# of the riser.

A disengager 100# may be in downstream communication with a second end 80b# of the riser 80# to receive the second catalyst stream from the second end 80b# of the riser 80#. The second end 80b# may bend at a right angle to feed a side of the disengager 100#. The second end 80b# may enter the disengager 100# tangentially to effect centripetal separation of hot gas from the second catalyst stream. The separated hot gas accumulates in the top of the disengager 100#. A hot gas conduit 104# may vent separated gas from an upper outlet 100b# of the disengager 100# though a control valve. The hot gas conduit 104# may communicate the disengager 100# with the regenerator 14# to transport hot gas from the disengager 100# to the regenerator 14#. A regenerator inlet conduit 140# extending from a lower end 100a# of the disengager 100# passes the second catalyst stream to the regenerator 14#, specifically to the hopper 170 in the regenerator. The hot gas may pass from the disengager 100# to the regenerator 14# in the regenerator inlet conduit 140# if the control valve on gas conduit 100b# is sufficiently closed. The regenerator inlet conduit 140# is in downstream communication with the catalyst outlet 71a# in the reactor vessel 61#. The regenerator inlet conduit 140# may extend into the hopper 170, through the opening 175 and below the open top 174 to ensure that the second catalyst stream does not pass into the interior 51#. The second catalyst stream exits through a regenerator entry 132# in the hopper 170 and is heated in the hopper 170. The heating of the second catalyst stream by heat exchange will be greater than by combustion of coke in the hopper 170. The heated second catalyst stream passes from the regenerator outlet 136# through the return conduit 178 from the regenerator 14# to the reactor inlet 72#. Withdrawal of the second catalyst stream through outlet 136# is regulated by adjusting the fluidization gas rate to the hopper in line 180 by a control valve on line 180.

The control valve on conduit 178 may be governed by a temperature indicator controller based on the temperature in the catalyst bed 66# in the reactor vessel 61#. The control valve on the catalyst outlet conduit 71# may be governed by a level indicator controller based on the level of the bed 66# in the reactor vessel 61#. The control valve on the regenerator inlet conduit 140# may be governed by a level indicator controller based on the level of the catalyst bed in the disengager 100#. Fresh catalyst may be fed to the disengager 100# in line 186.

SPECIFIC EMBODIMENTS

While the following is described in conjunction with specific embodiments, it will be understood that this description is intended to illustrate and not limit the scope of the preceding description and the appended claims.

A first embodiment of the invention is an apparatus comprising a reactor vessel comprising a hydrocarbon feed inlet, a catalyst outlet in the reactor vessel, a product outlet in the reactor vessel and a catalyst inlet to the reactor vessel; a heating chamber in direct communication with the catalyst outlet and a source of gas; a riser in downstream communication with the heating chamber at a first end; and the catalyst inlet in downstream communication with a second end of the riser. An embodiment of the invention is one, any or all of prior embodiments in this paragraph up through the first embodiment in this paragraph further comprising the reactor vessel above the heating chamber. An embodiment of the invention is one, any or all of prior embodiments in this paragraph up through the first embodiment in this paragraph wherein the catalyst outlet conduit directly communicates the catalyst outlet to the heating chamber. An embodiment of the invention is one, any or all of prior embodiments in this paragraph up through the first embodiment in this paragraph wherein the source of gas is an FCC regenerator. An embodiment of the invention is one, any or all of prior embodiments in this paragraph up through the first embodiment in this paragraph wherein the source of gas is a hydrocarbon source. An embodiment of the invention is one, any or all of prior embodiments in this paragraph up through the first embodiment in this paragraph wherein the feed inlet is above the catalyst outlet. An embodiment of the invention is one, any or all of prior embodiments in this paragraph up through the first embodiment in this paragraph further comprising a stripping section below the feed inlet. An embodiment of the invention is one, any or all of prior embodiments in this paragraph up through the first embodiment in this paragraph further comprising a disengaging section above the feed inlet in the reactor vessel. An embodiment of the invention is one, any or all of prior embodiments in this paragraph up through the first embodiment in this paragraph further comprising a conduit for transferring catalyst to the FCC regenerator.

A second embodiment of the invention is an apparatus comprising a reactor vessel comprising a feed inlet, a catalyst outlet in the reactor vessel, a product outlet in the reactor vessel and a catalyst inlet to the reactor vessel; a heating chamber in direct communication with the catalyst outlet and a source of gas, the reactor vessel being disposed above the heating chamber; a riser in downstream communication with the heating chamber at a first end; a disengaging section above the feed inlet in the reactor vessel; and the catalyst inlet in downstream communication with a second end of the riser. An embodiment of the invention is one, any or all of prior embodiments in this paragraph up through the second embodiment in this paragraph further comprising a stripping section below the feed inlet. a disengager in communication with the riser at a second end of the riser. An embodiment of the invention is one, any or all of prior embodiments in this paragraph up through the second embodiment in this paragraph wherein the catalyst outlet conduit directly communicates the catalyst outlet to the heating chamber. An embodiment of the invention is one, any or all of prior embodiments in this paragraph up through the second embodiment in this paragraph wherein the source of gas is an FCC regenerator. An embodiment of the invention is one, any or all of prior embodiments in this paragraph up through the second embodiment in this paragraph wherein the source of gas is a hydrocarbon source. An embodiment of the invention is one, any or all of prior embodiments in this paragraph up through the second embodiment in this paragraph wherein the feed inlet is above the catalyst outlet.

A third embodiment of the invention is a process for heating a catalyst bed to promote a reaction comprising passing a hydrocarbon feed stream to a reactor vessel to react over a catalyst bed in the reactor vessel and produce a product gas; withdrawing the product gas stream from the reactor vessel; withdrawing a catalyst stream from the reactor vessel; passing the catalyst stream from the reactor to a heating chamber; heating the catalyst stream with a gas stream in the heating chamber; and passing the heated catalyst stream to the reactor vessel. An embodiment of the invention is one, any or all of prior embodiments in this paragraph up through the third embodiment in this paragraph wherein the product gas stream and the catalyst stream are withdrawn from the reactor vessel separately. An embodiment of the invention is one, any or all of prior embodiments in this paragraph up through the third embodiment in this paragraph wherein the heated catalyst stream is withdrawn from a lower end of the heating chamber. An embodiment of the invention is one, any or all of prior embodiments in this paragraph up through the third embodiment in this paragraph further comprising passing the heated catalyst stream up a riser to the reactor vessel. An embodiment of the invention is one, any or all of prior embodiments in this paragraph up through the third embodiment in this paragraph further comprising using a gas to urge the heated catalyst stream up the riser.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:
1. A reactor apparatus comprising:
a reactor vessel comprising a hydrocarbon feed inlet, a catalyst outlet in the reactor vessel, a product outlet in the reactor vessel and a catalyst inlet to the reactor vessel;
a heating chamber in direct communication with the catalyst outlet and a source of gas;

a riser in downstream communication with said catalyst outlet at a first end and said heating chamber in direct communication with a second end of said riser;

said catalyst inlet in downstream communication with said second end of said riser.

2. The reactor apparatus of claim 1 further comprising said reactor vessel above said heating chamber.

3. The reactor apparatus of claim 1 wherein said source of gas is an FCC regenerator.

4. The reactor apparatus of claim 1 wherein said source of gas is a hydrocarbon source.

5. The reactor apparatus of claim 1 wherein said feed inlet is above the catalyst outlet.

6. The reactor apparatus of claim 1 further comprising a stripping section below said feed inlet.

7. The reactor apparatus of claim 1 further comprising a disengaging section above said feed inlet in said reactor vessel.

8. The reactor apparatus of claim 1 further comprising a conduit for transferring catalyst to the catalyst regenerator.

9. The reactor apparatus of claim 1 further comprising:
an FCC regenerator comprising a spent catalyst inlet, a regenerated catalyst outlet, a flue gas outlet, the first end of said riser being in direct communication with the flue gas outlet, wherein said source of gas is the FCC regenerator.

10. The reactor apparatus of claim 9 further comprising:
a second reactor vessel comprising a hydrocarbon feed inlet, a catalyst outlet in the second reactor vessel, a product outlet in the second reactor vessel, and a catalyst inlet to the second reactor vessel;
wherein the spent catalyst inlet is in downstream communication with the catalyst outlet of the second reactor vessel, and the catalyst inlet of the second reactor vessel is in downstream communication with the regenerated catalyst outlet.

11. The reactor apparatus of claim 9 wherein the FCC regenerator further comprises a hot gas inlet and the heating chamber further comprises a hot gas outlet in communication, the hot gas inlet of the FCC regenerator being in downstream communication with the hot gas outlet of the heating chamber.

12. The reactor apparatus of claim 9 wherein the reactor vessel further comprises a second catalyst outlet and the FCC regenerator further comprises a second spent catalyst inlet, the second spent catalyst inlet of the FCC regenerator being in downstream communication with the second catalyst outlet of the reactor vessel.

13. A reactor apparatus comprising:
a reactor vessel comprising a feed inlet, a catalyst outlet in the reactor vessel, a product outlet in the reactor vessel and a catalyst inlet to the reactor vessel;
a heating chamber in direct communication with the catalyst outlet and a source of gas, said reactor vessel being disposed above said heating chamber;
a riser in downstream communication with said catalyst outlet at a first end and said heating chamber in direct communication with a second end of said riser;
a disengaging section above said feed inlet in said reactor vessel; and
said catalyst inlet in downstream communication with said second end of said riser.

14. The reactor apparatus of claim 13 further comprising a stripping section below said feed inlet.

15. The reactor apparatus of claim 13 wherein said source of gas is an FCC regenerator.

16. The reactor apparatus of claim 13 wherein said source of gas is a hydrocarbon source.

17. The reactor apparatus of claim 13 wherein said feed inlet is above the catalyst outlet.

18. The reactor apparatus of claim 13 further comprising:
an FCC regenerator comprising a spent catalyst inlet, a regenerated catalyst outlet, a flue gas outlet, the first end of said riser being in direct communication with the flue gas outlet, wherein said source of gas is the catalyst regenerator;
a second reactor vessel comprising a hydrocarbon feed inlet, a catalyst outlet in the second reactor vessel, a product outlet in the second reactor vessel, and a catalyst inlet to the second reactor vessel;
wherein the spent catalyst inlet is in downstream communication with the catalyst outlet of the second reactor vessel, and the catalyst inlet of the second reactor vessel is in downstream communication with the regenerated catalyst outlet.

19. The reactor apparatus of claim 18 wherein the FCC regenerator further comprises a hot gas inlet and the heating chamber further comprises a hot gas outlet in communication, the hot gas inlet of the FCC regenerator being in downstream communication with the hot gas outlet of the heating chamber;
or
wherein the reactor vessel further comprises a second catalyst outlet and the catalyst regenerator further comprises a second spent catalyst inlet, the second spent catalyst inlet of the FCC regenerator being in downstream communication with the second catalyst outlet of the reactor vessel;
or both.

20. A reactor apparatus comprising:
a reactor vessel comprising a hydrocarbon feed inlet, a catalyst outlet in the reactor vessel, a product outlet in the reactor vessel and a catalyst inlet to the reactor vessel;
a heating chamber in direct communication with the catalyst outlet and a source of gas, wherein said source of gas is a hydrocarbon source;
a riser in downstream communication with said heating chamber at a first end; and
said catalyst inlet in downstream communication with a second end of said riser.

* * * * *